(12) United States Patent
Pelzer et al.

(10) Patent No.: US 12,488,461 B2
(45) Date of Patent: Dec. 2, 2025

(54) IMAGE ANNOTATION SYSTEM AND METHOD

(71) Applicant: LEICA MICROSYSTEMS CMS GMBH, Wetzlar (DE)

(72) Inventors: Patric Pelzer, Wetzlar (DE); Markus Ott, Wetzlar (DE)

(73) Assignee: LEICA MICROSYSTEMS CMS GMBH, Wetzlar (DE)

(*) Notice: Subject to any disclaimer, the term of this patent is extended or adjusted under 35 U.S.C. 154(b) by 411 days.

(21) Appl. No.: 18/067,030

(22) Filed: Dec. 16, 2022

(65) Prior Publication Data
US 2023/0196566 A1    Jun. 22, 2023

(30) Foreign Application Priority Data
Dec. 20, 2021   (EP) ................................ 21215993

(51) Int. Cl.
| | |
|---|---|
| *G06T 7/12* | (2017.01) |
| *G06F 3/04812* | (2022.01) |
| *G06F 3/04883* | (2022.01) |
| *G06F 3/14* | (2006.01) |
| *G06T 7/00* | (2017.01) |
| *G06V 10/25* | (2022.01) |

(52) U.S. Cl.
CPC ........ *G06T 7/0012* (2013.01); *G06F 3/04812* (2013.01); *G06F 3/04883* (2013.01); *G06F 3/14* (2013.01); *G06V 10/25* (2022.01); *G06T 2207/10056* (2013.01); *G06T 2207/20104* (2013.01)

(58) Field of Classification Search
CPC ... G06T 7/0012; G06V 10/25; G06F 3/04812; G06F 3/04883; G06F 3/14
USPC ............................................... 382/128
See application file for complete search history.

(56) References Cited

U.S. PATENT DOCUMENTS

| | | | |
|---|---|---|---|
| 11,954,852 B2* | 4/2024 | Xiao | G16H 30/40 |
| 12,198,329 B2* | 1/2025 | Tenney | G06T 7/0012 |
| 2010/0077304 A1* | 3/2010 | Zaman | G06F 3/0481 715/702 |
| 2010/0290693 A1* | 11/2010 | Cohen | A61B 5/0044 382/134 |

(Continued)

FOREIGN PATENT DOCUMENTS

WO    2014089499 A1    6/2014

*Primary Examiner* — William D Titcomb
(74) *Attorney, Agent, or Firm* — LEYDIG, VOIT & MAYER, LTD.

(57) ABSTRACT

An image annotation system for annotating a microscopic image of a sample is provided. The image annotation system includes an output unit configured to display the image of the sample, and an input unit configured to capture a first and second user input sequence including a first and second movement of a cursor over a first and second selection area of the displayed image. The image annotation system also includes a processor configured to determine at least one image area of the image of the sample by determining a first image area based on the first selection area, based on the second movement beginning within the first selection area, redetermine the first image area based on the first and second selection areas, and based on the second movement beginning outside the first selection area, determining a second image area based on the second selection area.

13 Claims, 4 Drawing Sheets

(56) References Cited

U.S. PATENT DOCUMENTS

| | | | |
|---|---|---|---|
| 2011/0060766 A1 | 3/2011 | Ehlke et al. | |
| 2011/0115746 A1* | 5/2011 | Wang | G06F 3/0412 |
| | | | 345/175 |
| 2013/0127758 A1* | 5/2013 | Kim | G06F 3/041 |
| | | | 345/173 |
| 2013/0234964 A1* | 9/2013 | Kim | G06F 3/0488 |
| | | | 345/173 |
| 2021/0118136 A1* | 4/2021 | Hassan-Shafique | G16B 20/20 |
| 2021/0209752 A1* | 7/2021 | Tenney | G06T 7/30 |
| 2021/0343012 A1* | 11/2021 | Xiao | G06T 7/90 |
| 2023/0196566 A1* | 6/2023 | Pelzer | G06F 3/04812 |
| | | | 382/128 |
| 2023/0196725 A1* | 6/2023 | Pelzer | G06F 3/14 |
| | | | 382/106 |

* cited by examiner

IMAGE ANNOTATION SYSTEM AND METHOD

CROSS-REFERENCE TO PRIOR APPLICATION

This application claims benefit to European Patent Application No. EP 21215993.3, filed on Dec. 20, 2021, which is hereby incorporated by reference herein.

FIELD

The invention relates to an image annotation system for annotating a microscopic image of a sample. The invention further relates to a method for determining at least one image area in a microscopic image of a sample based on a user input.

BACKGROUND

In order to process large amounts of images gathered by a microscope, machine learning algorithms are used. When properly trained, these machine learning algorithms can autonomously classify, that is identify and label, objects within the microscopic images. A set of annotated images called the training dataset is used for training. This training dataset provides examples of what the machine learning algorithm should reproduce. Depending on the task, the examples comprise single pixel and/or the outline of a full object that needs to be classified by the machine learning algorithm. The outline of the full object allows the machine learning algorithm to understand the larger context. For example, if the object to be classified is a circular object with only a bright edge, then it is difficult to correctly identify a dim signal in the middle of the object. Further, outlining the full object allows the machine learning algorithm to understand the concept of a circle and inside/outside, so it has a chance to classify the whole object properly.

The examples in the training data set may need to be provided by the user. In order to efficiently generate a training data set, the user needs an image annotation system. For example, a visual interface may be used that allows the user to label individual pixel in a microscopic image by means of image processing tools, in particular, a visual interface that allows the user to draw labels on top of the microscopic image.

SUMMARY

In an embodiment, the present disclosure provides an image annotation system for annotating a microscopic image of a sample. The image annotation system includes an output unit configured to display the image of the sample, and an input unit configured to capture a first user input sequence including a first movement of a cursor over a first selection area of the displayed image, and at least one second user input sequence comprising a second movement of the cursor over a second selection area of the displayed image. The image annotation system also includes a processor configured to determine at least one image area of the image of the sample by determining a first image area of the at least one image area based on the first selection area, based on the second movement beginning within the first selection area, redetermine the first image area based on the first and second selection areas, and based on the second movement beginning outside the first selection area, determining a second image area of the at least one image area based on the second selection area.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Embodiments of the present invention provide an image annotation system and a method that allows a user to annotate a microscopic image in a fast and easy way.

An embodiment of the proposed image annotation system for annotating a microscopic image of a sample comprises an output unit configured to display the image of the sample, and an input unit configured to capture a first user input sequence comprising a first movement of a cursor over a first selection area of the displayed image, and at least one second user input sequence comprising a second movement of the cursor over a second selection area of the displayed image. The image annotation system further comprises a processor. The processor is configured to determine at least one image area of the image of a sample by determining a first image area based on the first selection area, and when the second movement begins within the first selection area, redetermine the first image area based on the first and second selection areas, and when the second movement begins outside the first selection area, determining a second image area based on the second selection area.

The microscopic image can be annotated by assigning the first and second image areas to different regions of the microscopic image. Each of the image areas may correspond to a different object or region of the sample. The different image areas can be generated by a movement of the cursor over the microscopic image that is annotated. This gesture is like the movement of a brush painting over the microscopic image, thereby providing an intuitive way of annotating the microscopic image. When the movement of the cursor starts within an already defined image area, the image area is extended. This allows for a fast correction of already generated image areas. Thus, the image annotation system provides a user with a fast and easy to use smart tool that supports them in annotating the microscopic image, for example in order to generate a training data set for a machine learning algorithm.

In a preferred embodiment, the cursor comprises a cursor shape, and the first selection area is the area of the displayed image that the cursor shape passes over during the first movement, and the second selection area is the area of the displayed image that the cursor shape passes over during the second movement. In an embodiment, the cursor shape is an ellipse, a circle, a rectangle or a square. In a preferred embodiment, the cursor shape is dimensioned such that it comprises multiple pixel of the microscopic image. This allows the user to select multiple pixel at once, thereby speeding up the process. In another preferred embodiment, the cursor shape and/or size can be selected by the user. By providing one or more cursor shapes the user can select the right tool depending on the detail of the region of the microscopic image they need to select. Thereby, the versatility of the image annotation system is further increased.

In another preferred embodiment, the processor is configured to determine whether the second movement begins within the first selection area by determining whether the center of gravity of the cursor shape is within the first selection area when the second movement begins. Thereby, an intuitive measure is provided whether the majority of the cursor shape is within the first selection area. This allows the user to easily expand the first selection area, thereby quickly correcting errors or further refining the shape of the first selection area.

In another preferred embodiment, the first image area corresponds to the first selection area, and the second image area corresponds to the second selection area, when the second movement begins outside the first selection area. The first image area corresponds to the union of the first and second selection areas, when the second movement begins inside the first selection area. In this embodiment, the image areas are identical with the selection areas. This allows the user to very precisely select the image areas. Alternatively, or additionally, the processor may be configured to expand and/or shrink the image areas relative to the respective selection areas, for example based on an image content of the microscopic image.

In another preferred embodiment, the processor is configured to generate an object map comprising image points, each image point corresponding to an image point of the image of the sample. Each image point of the object map encodes the information which image area the corresponding image point of the image of the sample belongs to. The object map is distinct from the microscopic image and can be used to generate a training data set for a machine learning algorithm.

In another preferred embodiment, the processor is configured to determine the beginning of the first and second movements based on a button press, and the end of the first and second movements based on a button release. Using a button press/release as a way of determining the beginning and end of the first and second movements is very intuitive. This allows the user to select the first and second image areas very fast, allowing for a high through put.

In another preferred embodiment, the input unit is a computer mouse. In this embodiment, the processor is configured to determine the first and second movements of the cursor based on a movement of the computer mouse. Alternatively, other input units such as a joystick or a track ball may be used. In particular, the image annotation system can be setup up such that many different input devices may be used. Thereby, the user may select the input device they are most comfortable with ensuring an intuitive and fast use of the image annotation system.

In another preferred embodiment, the image annotation system comprises a touchscreen forming the output unit and/or the input unit. In a preferred embodiment, the processor is configured to determine the beginning of the first and second movements by determining that an object is touching the touchscreen, and to determine the end of the first and second movements by determining that the object is no longer touching the touchscreen. The processor is configured to determine the first and second movements of the cursor based on a movement of the object over the touchscreen. The object may be a finger of the user, a pen or a stylus. Using a touchscreen, in particular in combination with a pen or stylus, is very intuitive since it mimics the use of pen and paper. This allows the user to quickly annotate the microscopic image.

In another preferred embodiment, the image annotation system comprises a virtual reality and/or an augmented reality interface that is configured to provide the input unit and/or the output unit. Virtual and augmented reality provide an intuitive way of interacting with the image annotation system.

In another preferred embodiment, the output unit is configured to display the first and second image areas. Thereby, the image annotation system provides the user with feedback with regards to the first and second user input sequences defining the first and second image areas, respectively. This further increase ease of use.

Embodiments of the present invention also relate to a microscope system comprising an optical detection system configured to capture an image of a sample and an image annotation system as described above.

Embodiments of the present invention also relate to a method for determining at least one image area in a microscopic image of a sample based on a user input, comprising the following steps: displaying the image of the sample, capturing a first user input sequence comprising a first movement of a cursor over a first selection area of the displayed image of the sample, determining a first image area based on the first user input sequence, and capturing a second user input sequence comprising a second movement of the cursor over a second selection area of the displayed image of the sample. When the second movement begins within the first selection area, redetermine the first image area based on the first and second user input sequences. When the second movement begins outside the first selection area, determining a second image area based on the second user input sequence.

The method has the same advantages as the image annotation system described above. In particular, the method can be supplemented using the features of the dependent claims directed at the image annotation system.

Embodiments of the present invention further relate to a computer program with a program code for performing the method described above when the computer program is run on a processor. The processor may comprise at least one of a CPU (Central Processing Unit), GPU (Graphics Processing Unit), FPGA (Field Programmable Gate Array), ASIC (Application-Specific Integrated Circuit), and DSP (Digital Signal Processor).

The image annotation system is described above mostly in connection with machine learning. However, the use of the image annotation system is not limited the generating image data that can be used as training image data for use with machine learning algorithms. For example, the image annotation system may be used to comment or highlight certain features of the microscopic image for a human observer.

Figure 1:
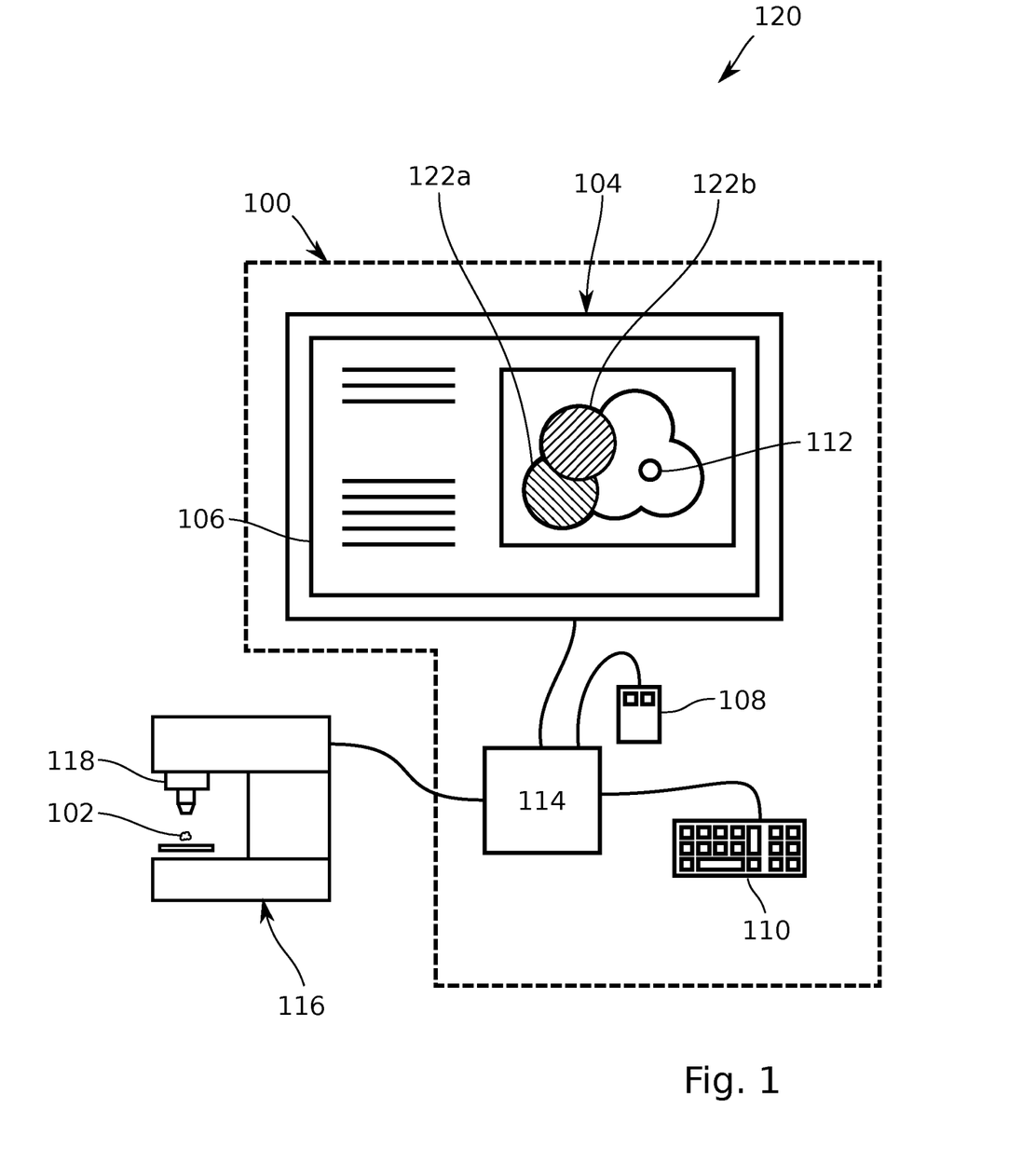
FIG. 1 is a schematic view of an image annotation system for annotating a microscopic image of a sample.

FIG. 1 is a schematic view of an image annotation system 100 for annotating a microscopic image of a sample 102.

In the present embodiment, the image annotation system 100 comprises an output unit 104 which is exemplary formed as a computer monitor having a display area 106, and two input units which are exemplary formed as a computer mouse 108 and a keyboard 110, respectively. The computer mouse 108 is configured to receive a user input and to move a cursor 112 over the display area 106 of the output unit 104. The keyboard 110 is also configured to receive a user input, in particular in the form of a button press/release. The image annotation system 100 further comprises a processor 114 which is connected to the output unit 104 and the input units 108, 110. The processor 114 is further connected to a microscope 116 that has an optical detection system 118 configured to capture the microscopic image of the sample 102. The image annotation system 100 and the microscope 116 may form a microscope system 120.

The processor 114 is configured to receive image data corresponding to the microscopic image of the sample 102 from the microscope 116. The processor 114 may receive the image data for example via a direct connection, a network connection or a data medium. The processor 114 is configured to control the output unit 104 to display the microscopic image of the sample 102 on the display area 106. The processor 114 is also configured to receive control data corresponding to the user input to the two input units 108, 110. Further, the processor 114 is configured to perform a method for determining at least one image area 122*a*, 122*b* in the microscopic image of the sample 102 based on an input by a user. The method is described below with reference to FIGS. 2 to 4.

Figure 2:
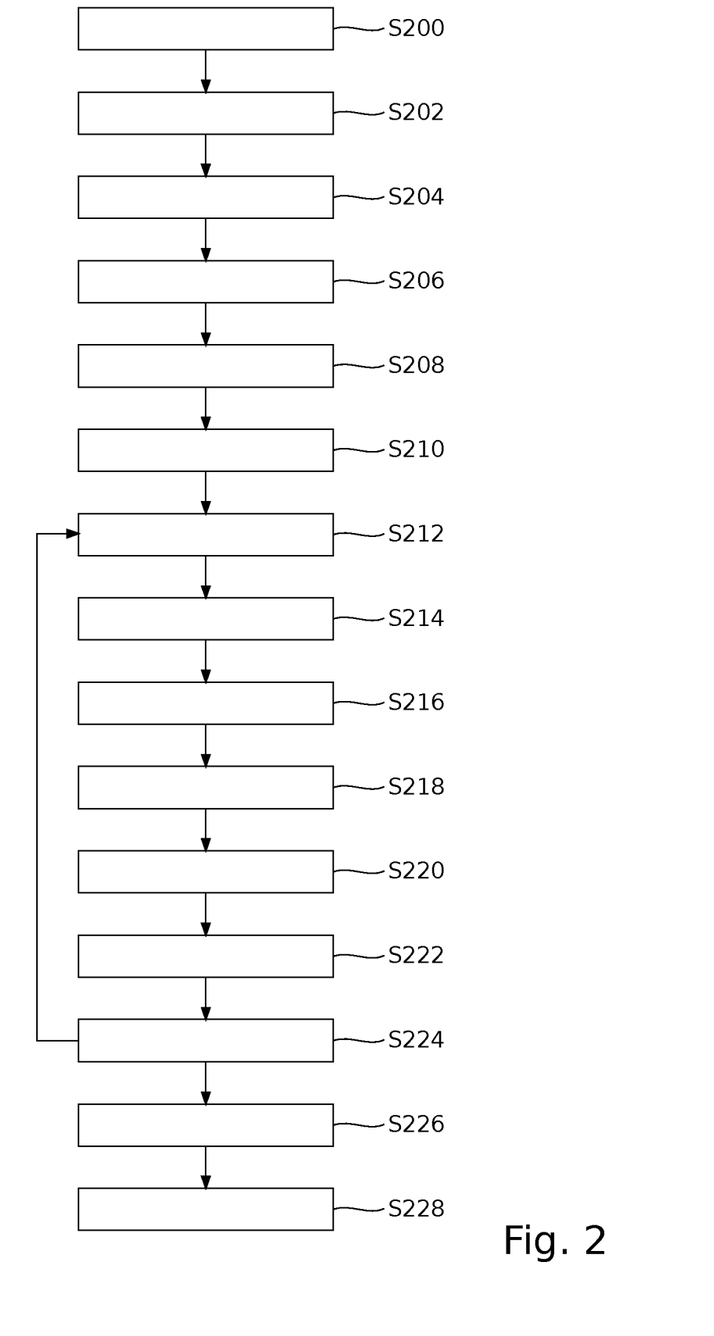
FIG. 2 is a flowchart of a method for determining at least one image area in the microscopic image of the sample based on a user input.

FIG. 2 is a flowchart of the method for determining the at least one image area 122*a*, 122*b* in the microscopic image of the sample 102 based on the user input.

The process is started in step S200. In an optional step S202 the user determines a zoom level of the microscopic image displayed on the display area 106 of the output unit 104 in order to determine the visible level of detail. In step S202 the user may also select a cursor shape such as a pointer, a circle or any other suitable shape. In step S204 a button is pressed. This may be a button of the computer mouse 108 or the keyboard 110. In other embodiments the button press may correspond to an object such as a stylus touching the surface of a touch screen. The button press determines the beginning of a first movement. In step S206 the cursor 112 is moved in the first movement over a first selection area of the microscopic image displayed on the display area 106 of the output unit 104. The first movement may for example be facilitated by a movement of the computer mouse 108 or a movement of the stylus over the touch screen. In step S208 the button is released determining the end of the first movement. The button press, the first movement of the cursor 112, and the button release are a first input sequence. The processor 114 then determines a first image area 122*a* based on the first selection area in step S210. In a preferred embodiment, the first image area 122*a* is identical to the first selection area. Alternatively, the processor 114 may determine the first image area 122*a* also based on an image content of the microscopic image. For example, the processor 114 may disregard pixel of the microscopic image having a brightness value below a certain threshold.

In step S214 the button is pressed again. This time, the button press determines the beginning of a second movement. In step S216 the processor 114 determines whether or not the cursor 112 is within the first image area 122*a* when the second movement begins. For example, when the cursor shape is a pointer, the processor 114 determines whether a tip of the pointer is within the first image area 122*a* when the second movement begins. When the cursor shape an extended shape, for example a circle, the processor 114 may determine whether the center of gravity of the cursor shape is within the first image area 122*a* when the second movement begins. In step S218 the cursor 112 is moved in the second movement over a second selection area of the microscopic image displayed on the display area 106 of the output unit 104. In step S220 the button is released determining the end of the second movement. The button press, the second movement of the cursor 112, and the button release are a second input sequence. When the second movement started within the image selection area 122*a*, the processor 114 redetermines the first image area 122*a* based on the first and second selection areas in step S222. In a preferred embodiment, the redetermined first image area 122*a* is identical to the union of the first and second selection areas. When the second movement started outside the first selection area, the processor 114 determines a second image area 122*b* based on the second selection area in step S224. In another preferred embodiment, the second image area 122*b* is identical to the second selection area. The steps S214 to S224 are described below in more detail with reference to FIGS. 3 and 4.

The steps S212 to S224 may be repeated in order to determine additional image areas 122*a*, 122*b*. When the steps S212 to S224 are repeated, in step S216 the processor 114 determines whether or not the cursor 112 is within the any of the already determined image areas 122*a*, 122*b* when the second movement begins. In step S222 the processor 114 then redetermines the image area 122*a*, 122*b* in which the second movement started. Optionally, when in step 214 another button is pressed or another button is pressed in addition, an eraser mode is triggered until the button is released and the second movement ends. In the eraser mode, the processor 114 subtracts the second selection area from all previously defined image areas 122*a*, 122*b* after the button is released. This allows for the quick correction of error.

In an optional step S226 the processor 114 generates an object map. The object map comprises image points, each image point corresponding to an image point of the image of the sample 102. Each image point of the object map encodes the information which image area 122*a*, 122*b* the corresponding image point of the image of the sample 102 belongs to. The object map may be used to generate a training data set for a machine learning algorithm. The process is then ended in step S228.

Figure 3:
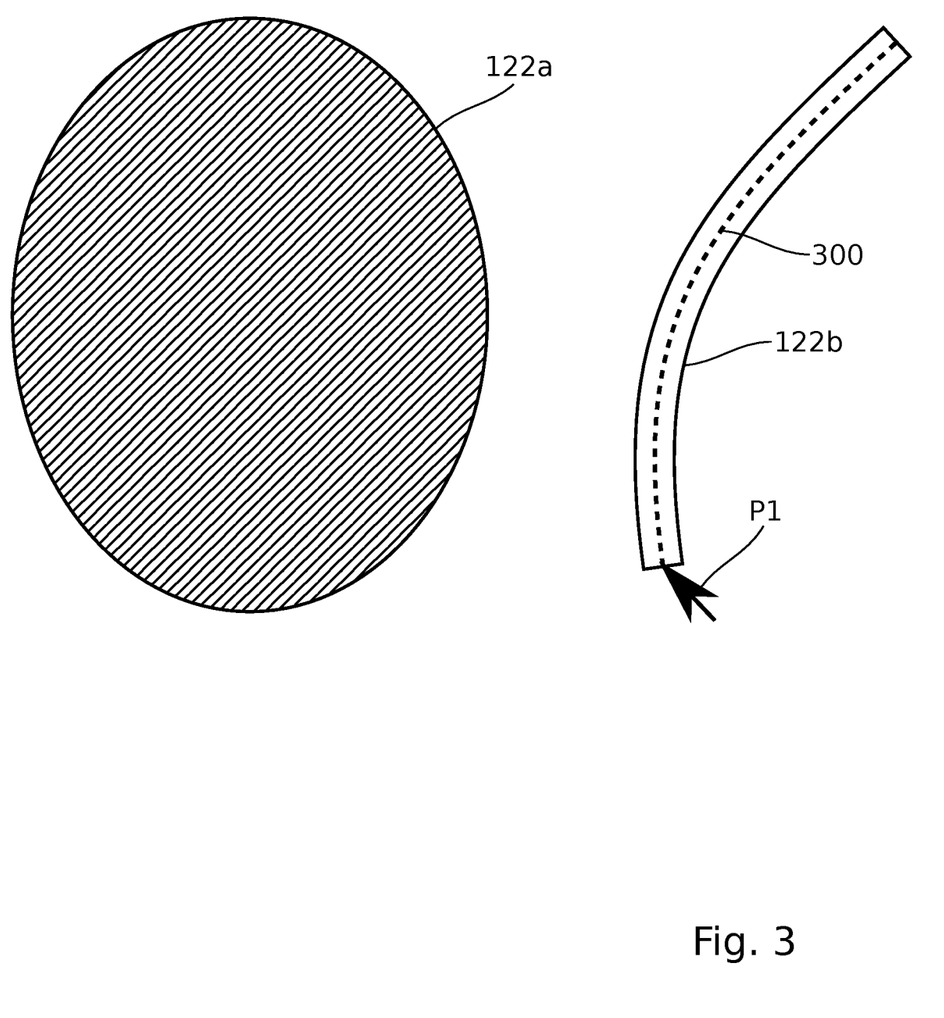
FIG. 3 a schematic view of first and second image areas.

FIG. 3 is a schematic view of the first and second image area 122*bs*.

The second movement of the cursor 112 is shown in FIG. 3 as a dashed line 300. The starting point of the second movement is shown in FIG. 3 by an arrow P1. As can be seen in FIG. 3, the second movement was started outside the first image area 122*a*. Accordingly, the processor 114 determines the second image area 122*b* to be the area the cursor shape was moved over during the second movement, i.e. the second selection area.

Figure 4:
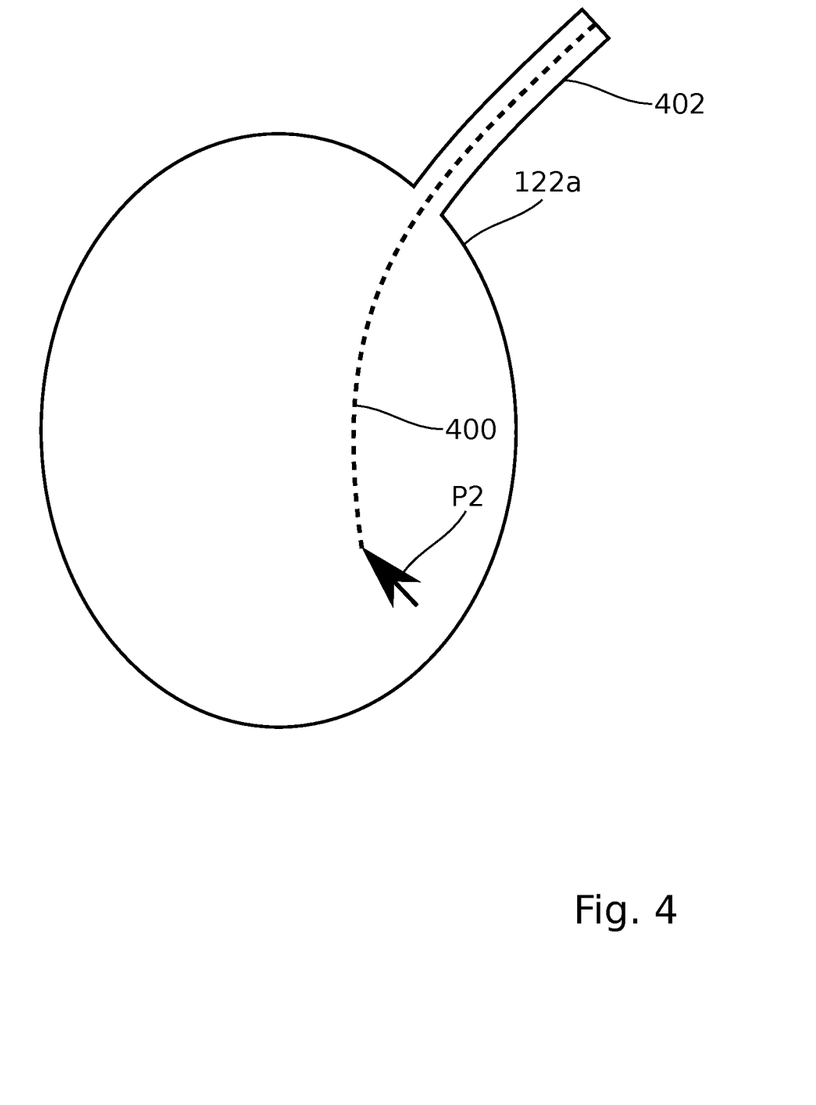
FIG. 4 a schematic view of the first area.

FIG. 4 is a schematic view of the first image area 122*a*.

The second movement of the cursor 112 is shown in FIG. 4 as a dashed line 400. The starting point of the second movement is shown in FIG. 4 by an arrow P2. As can be seen in FIG. 4, the second movement was started inside the first image area 122*a*. Accordingly, the processor 114 redetermines the first image area 122*a* to also include an area 402 the cursor shape was moved over during the second movement, i.e. the second selection area.

Identical or similarly acting elements are designated with the same reference signs in all Figures. As used herein the term "and/or" includes any and all combinations of one or more of the associated listed items and may be abbreviated as "/".

Both the individual features of the embodiments and all combinations of the features among each other are considered disclosed. Furthermore, the individual features of the embodiments are considered disclosed in combination with individual features or feature groups of the preceding description and/or in combination with individual features or feature groups of the claims.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Image annotation system
102 Sample
104 Output unit
106 Display area
108, 110 Input unit
112 Cursor
114 Processor
116 Microscope
118 Optical detection system
120 Microscope system
122a, 122b Image area
300, 400 Line
402 Area
P1, P2 Arrow

The invention claimed is:

1. An image annotation system for annotating a microscopic image of a sample, the image annotation system comprising:
   an output unit configured to display the image of the sample;
   an input unit configured to capture a first user input sequence and at least one second user input sequence, the first user input sequence comprising a first beginning location of a cursor and a first movement of the cursor from the first beginning location over a first selection area of the displayed image, the second user input sequence comprising a second beginning location of the cursor and a second movement of the cursor from the second beginning location over a second selection area of the displayed image; and
   a processor configured to:
      determine at least one image area of the image of the sample by:
         determining a first image area of the at least one image area based on the first selection area defined by the first user input sequence;
         upon determining that the second beginning location of the cursor is within the first selection area, redetermining the first image area based on both the first selection area and the second selection area; and
         upon determining that the second beginning location of the cursor is outside the first selection area, determining a second image area of the at least one image area based on the second selection area; and
      generate an object map comprising image points, each image point corresponding to an image point of the image of the sample, wherein each image point of the object map encodes information regarding which of the at least one image area the corresponding image point of the image of the sample belongs to.

2. The image annotation system according to claim 1, wherein the cursor comprises a cursor shape, the first selection area is a first area of the displayed image that the cursor shape passes over during the first movement, and the second selection area is a second area of the displayed image that the cursor shape passes over during the second movement.

3. The image annotation system according to claim 2, wherein the processor is configured to determine whether the second beginning location of the cursor is within the first selection area by determining whether a center of gravity of the cursor shape at the second beginning location is within the first selection area.

4. The image annotation system according to claim 2, wherein the cursor shape is an ellipse, a circle, a rectangle or a square.

5. The image annotation system according to claim 1, wherein the first image area corresponds to the first selection area, and the second image area corresponds to the second selection area, based on the second beginning location of the cursor being outside the first selection area, and wherein the first image area corresponds to a union of the first selection area and the second selection area, based on the second beginning location of the cursor being inside the first selection area.

6. The image annotation system according to claim 1, wherein the processor is configured to determine each of the first beginning location of the cursor or the second beginning location of the cursor based on a button press, and an end of the first movement or the second movement based on a button release.

7. The image annotation system according to claim 1, wherein the input unit is a computer mouse; and wherein the processor is configured to determine the first movement and the second movement of the cursor based on a movement of the computer mouse.

8. The image annotation system according to claim 1, comprising a touchscreen forming the output unit and/or the input unit.

9. The image annotation system according to claim 8, wherein the processor is configured to determine the first beginning location of the cursor and the second beginning location of the cursor by determining that an object is touching the touchscreen, and to determine an end of the first movement or the second movement by determining that the object is no longer touching the touchscreen, and wherein the processor is configured to determine the first movement and the second movement of the cursor based on a movement of the object over the touchscreen.

10. The image annotation system according to claim 1, wherein the output unit is configured to display the first image area and the second image area.

11. The microscope system comprising:
an optical detection system configured to capture the image of the sample; and
the image annotation system according to claim 1.

12. A method for determining at least one image area in a microscopic image of a sample based on a user input, the method comprising:
displaying the image of the sample on an output unit;
capturing, using a processor and via an input unit, a first user input sequence comprising a first beginning location of a cursor and a first movement of the cursor from the first beginning location over a first selection area of the displayed image of the sample;
determining, using the processor, a first image area based on the first user input sequence;
capturing, using the processor and via the input unit, a second user input sequence comprising a second beginning location of the cursor and a second movement of the cursor from the second beginning location over a second selection area of the displayed image of the sample;
upon determining that the second beginning location of the cursor is within the first selection area, redetermining, using the processor, the first image area based on the first user input sequence and the second user input sequence;
upon determining that the second beginning location of the cursor is outside the first selection area, determining, using the processor, a second image area based on the second user input sequence; and
generating an object map comprising image points, each image point corresponding to an image point of the image of the sample, wherein each image point of the object map encodes information regarding which of the first image area or the second image area the corresponding image point of the image of the sample belongs to.

13. A non-transitory computer-readable medium having processor-executable instructions stored thereon, wherein the processor-executable instructions, when executed by the one or more processors, facilitate performance of the method according claim 12.

* * * * *